(12) United States Patent
O'Callaghan et al.

(10) Patent No.: US 11,427,367 B2
(45) Date of Patent: Aug. 30, 2022

(54) METHOD AND SYSTEM FOR LABELING COMPONENTS

(71) Applicant: Dell Products L.P., Round Rock, TX (US)

(72) Inventors: Marie O'Callaghan, Cork (IE); John Caufield, Cork (IE); Daniel Bradfield, Cork (IE); Martin Buckley, Cork (IE); Craig Conroy, Cork (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/944,220

(22) Filed: Jul. 31, 2020

(65) Prior Publication Data
US 2022/0033127 A1 Feb. 3, 2022

(51) Int. Cl.
*B65C 9/40* (2006.01)
*B65C 9/46* (2006.01)

(52) U.S. Cl.
CPC .............. *B65C 9/40* (2013.01); *B65C 9/46* (2013.01); *B65C 2009/408* (2013.01)

(58) Field of Classification Search
CPC ........ B65C 9/40; B65C 9/46; B65C 2009/404; B65C 2009/405; B65C 2009/407; B65C 2009/408; B07C 5/3412; B07C 5/344
See application file for complete search history.

(56) References Cited

U.S. PATENT DOCUMENTS

| | | | |
|---|---|---|---|
| 2013/0174960 A1* | 7/2013 | Goetz | B65C 3/00 156/64 |
| 2017/0152070 A1* | 6/2017 | Roe | B65C 9/1869 |
| 2019/0308220 A1* | 10/2019 | Sun | B65C 9/30 |
| 2021/0130028 A1* | 5/2021 | Lu | B65C 9/26 |

* cited by examiner

*Primary Examiner* — George R Koch
(74) *Attorney, Agent, or Firm* — Terrile, Cannatti & Chambers; Emmanuel A. Rivera

(57) ABSTRACT

A system, method, and computer-readable medium are disclosed for labeling a component for component serialization. The component labeling is initiated, and a label is printed for the component. A collaborative robot or "cobot" retrieves the printed label and moves the label in place for attachment. Iterative views are performed until a tolerance value of the views is reached and the label is attached to the component. Information on the label and other labels are scanned and entered into an enterprise resource planning (ERP) system.

17 Claims, 4 Drawing Sheets

METHOD AND SYSTEM FOR LABELING COMPONENTS

BACKGROUND OF THE INVENTION

Field of the Invention

The present invention relates to manufacturing of computer systems. More specifically, embodiments of the invention relate to automating the labeling of components used in the manufacturing and integration of computer systems.

Description of the Related Art

In manufacturing and integration of computer systems, such as server computers, workstations, laptop computers, data storage systems etc., different parts and sub-systems, collectively referred to as components, may be sourced from various suppliers. In other words, the same component integrated into a computer system may be sourced from different suppliers. Each of the suppliers can have their own particular identification or part number for the component.

Component serialization includes the process of identifying and registering components with a manufacturer's part number, serial number, and other information in order to track components. For example, component serialization can be implemented in an enterprise resource planning (ERP) system that manages resources such as components that are installed in manufacturer products such as computer systems.

The marking or labeling of supplier sourced components with a manufacturer's information allows components to be identified in component serialization. A component from one or different suppliers can vary in size and dimensions. Labels can also vary in size and dimensions. In certain instances, there may be a particular location on a component on which a label is to be attached. Therefore, to accurately place and attach a label on a component can be a challenging process.

SUMMARY OF THE INVENTION

A system, method, and computer-readable medium are disclosed for labeling a component for component serialization. The component labeling is initiated when a determination is made that the component is in position. A label is printed for the component. A collaborative robot or "cobot" is instructed to retrieve the printed label and moves the label in place for attachment to the component. Iterative views or dynamic closed loop vision is performed until a tolerance value of the views is reached and the label is attached to the component. Information on the label and other labels are scanned and entered into an enterprise resource planning (ERP) system.

BRIEF DESCRIPTION OF THE DRAWINGS

The use of the same reference number throughout the several figures designates a like or similar element. The present invention may be better understood, and its numerous objects, features, and advantages made apparent to those skilled in the art by referencing the accompanying drawings, wherein.

DETAILED DESCRIPTION

A system, method, and computer readable medium are disclosed for automated labeling of components. In certain embodiments, different components are supported, such as hard drive units (drives), that are installed or integrated into computer systems. For each component (e.g., drive) that is processed, a unique serial number (S/N) label is printed to be attached to the component. The printed S/N label is checked as to quality and exact location which can be performed through vision or cameras. A collaborative robot or "cobot" connected to the cameras receives the location of the printed S/N label and picks up the printed S/N label, along with a logo label. The logo label may be part of an array of logo labels in a fixed tray or fixture. The printed S/N label is attached to the component. In instances when the component is a drive, a latch of a door on the drive may be closed after attaching the S/N label. In certain implementations, a chamfered wheel (not shown) is provided on the latch to force the latch into the correct position. A picture is taken of where the logo label is to be attached on the component. The exact location of where the logo label is to be attached can be determined with dynamic closed loop vision that makes use of relative views from the cobot and component. The logo label is attached. A camera can take images (scans) of barcode information of the labels and provide the information to an enterprise resource planning (ERP) system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
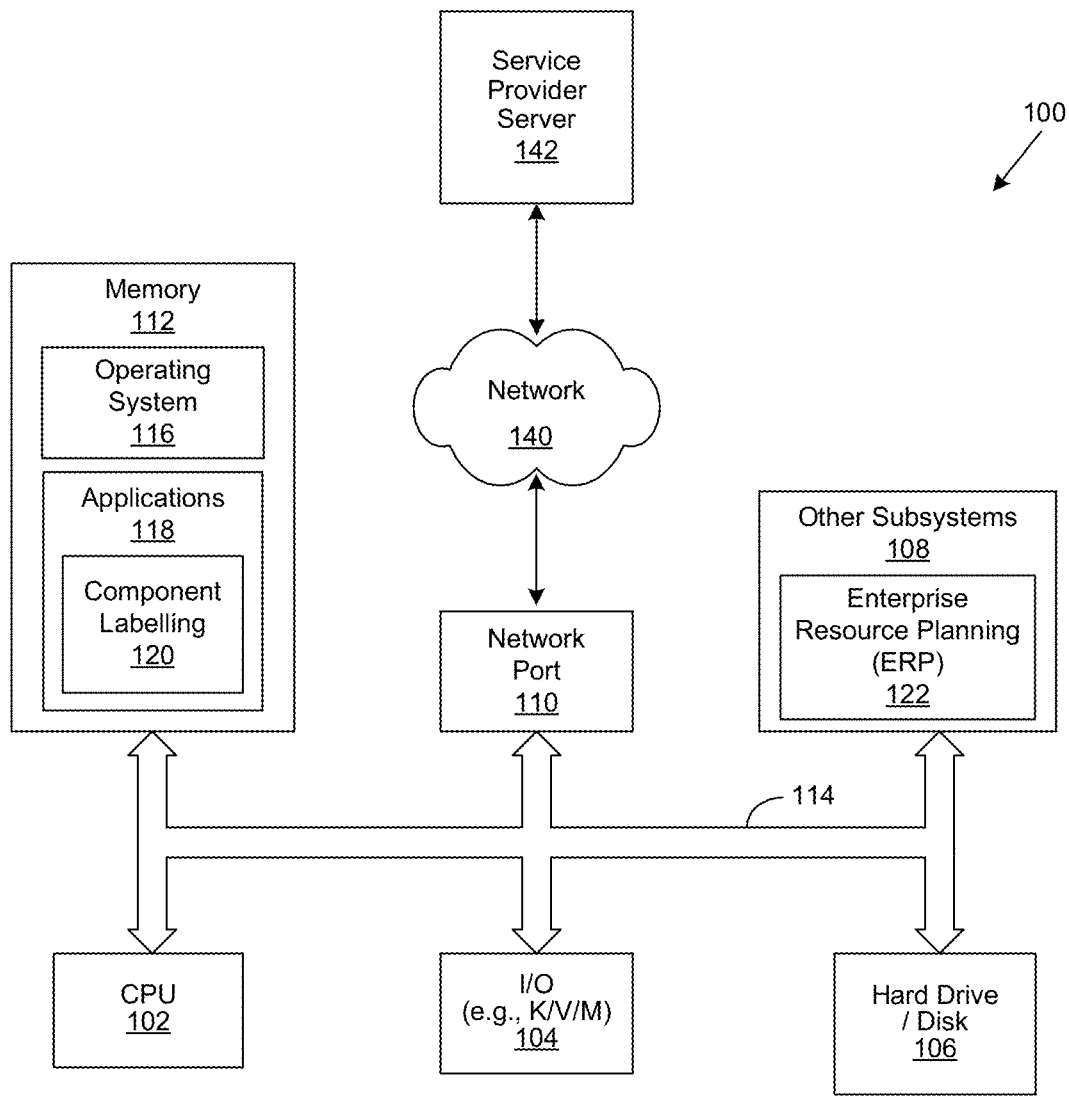
FIG. 1 depicts a general illustration of a computing system as implemented in the system and method of the present invention.

FIG. 1 illustrates an information handling system 100 that can be used to implement the system and method of the present invention. The information handling system 100 includes a processor (e.g., central processor unit or "CPU") 102, input/output (PO) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The network 140 may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope or intent of the invention.

The information handling system 100 likewise includes system memory 112, which is interconnected to the foregoing via one or more buses 114. System memory 112 further includes an operating system (OS) 116 and applications 118. In certain embodiments, applications 118 are provided as a service from the service provider server 142.

Certain embodiments provide for applications 118 to include a component labeling 120, and other subsystems 108 to include an enterprise resource planning (ERP) system 122. Component labeling 120 and ERP system 122 are further described herein.

Figure 2:
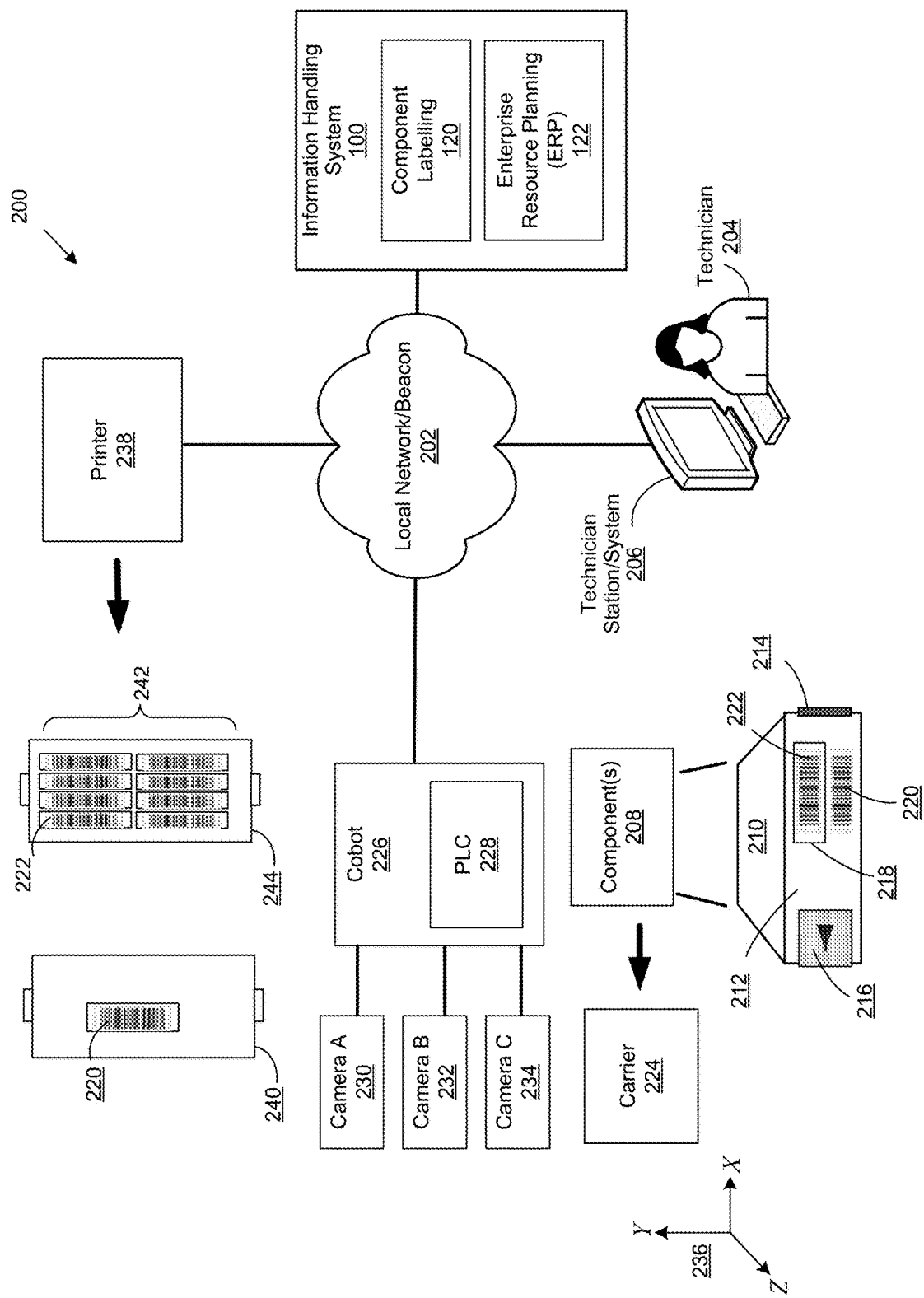
FIG. 2 depicts a system for automated labeling of components.

FIG. 2 is a simplified block diagram of a system for automated labeling of components. The system 200 includes the information handling system 100 which includes component labeling 120 and ERP 122. In certain implementations, the information handling system 100 connects with other devices and systems of the system 100 through a local network/beacon 202 which can include wired connections and wireless connections (e.g., beacon). It is also to be understood, that other implementations provide for direct connection of the information handling system 100 and other devices and systems of the system 200.

Certain implementations provide for a technician 204 through a technician station/system 206 to connect with the information handling system 100. In particular, the technician 204 can control or implement the use of component labeling 120 during an automated printing process, and the ERP 122 in implementing component serialization process.

In various implementations, component(s) 208 from various different suppliers are received for labeling by a manufacturer and component serialization in ERP 122. An example of component(s) 208 are storage drive units or drives, such as disk drives or solid state drives (SSD). For example, component(s) 208 can include a drive a drive 210, which for example can be a 2.5" or 3.5" drive. In various implementations, the drive 210 includes a door 212 with a hinge 214 that is opened and closed by a latch 216. In certain implementations, a chamfered wheel (not shown) is provided on the latch 216 to force the latch 216 into the correct position. The door 212 can include a window 218. Certain implementations provide for a serial number (S/N) label 220 to be placed on the drive 210. In various implementations, the automated labeling process may operatively open or close the door 214 when attaching S/N label 220.

Certain implementations provide for logo label 222 to be placed inside in the window 218. Because the window 218 has specific measurements, placement of the logo label 222 is within the specific measurements defined by the widow 218. Therefore, variations across drives 210 and label sheets from which logo label 222 is retrieved from are considered when attaching the logo label 222 on a drive 210.

In certain implementations, a component(s) 208 (e.g., drive 210) is placed in a carrier 224. The carrier 224 can be specific to support a particular component 208. Therefore, there can be different and various carriers 224. For example, there can be a specific carrier 224 for 3.5" drive and another specific carrier for a 2.5" drive.

In various embodiments, the system 200 includes a collaborative robot or cobot 226. In certain implementations, the cobot 226 can be controlled through programmable logic control or PLC 228 by information handling system 100 and component labeling 120. In particular, the cobot 226 through PLC 228 communicates with information handling system 100, either directly or through network/beacon 202. Cobot 226 can be implemented to pick up labels and attached labels to component(s) 208. Certain implementations provide for an arm on cobot 226 to perform the actions of picking up and attaching the labels.

Various implementations provide for the cobot 226 to connect with a camera A 230, a camera B 232, and a camera C 234. Connection of cobot 226 with camera A 230, camera B 232 and camera C 234 can be direct or indirect. In certain implementations, the camera A 230 is attached to the arm of cobot 226 which picks up and attaches labels.

Component(s) 208 are three dimensional in character. Therefore, the location in which a label is located in three dimensions. Relative views of camera A 230 and camera B 232 based on "X, Y, Z" plane 236. The perspective view of camera A 230 visualizes or detects where a where a label on a component 208 is placed. The camera B 232 can be placed at a location, such as proximate to carrier 224 to provide a perspective view to visualize or detect where a label is being held by cobot 226. The perspective views of camera A 230 and camera B 232 are provided to information handling system 100 and component labeling to calculate the exact location of where to attach a label on component 208.

The camera C 234 can be placed at a location to scan the labels, such as S/N label 220 and logo label 222, and other labels. In certain implementations, the labels include barcodes with information that are scanned. Scanned labels and information are provided to ERP 122.

Various embodiments provide for the system 200 include a printer 238 which can be controlled by information handling system 100 and controlled in particular by component labeling 120. The printer 238 can include various types of printers, such as gel label printers. Various implementations provide for printer 238 to print out the S/N label 220 which can be placed in a fixture or tray 240. In certain implementations, the printer 238 prints out label sheets 242 that are an array of logo labels 222 and are placed in a fixture or tray 244. The fixtures or trays 240 and 244 can be elevated surfaces to allow cobot 226 to pick up labels 220 and 222 from underneath the fixtures or trays 240 and 244.

Figure 3:
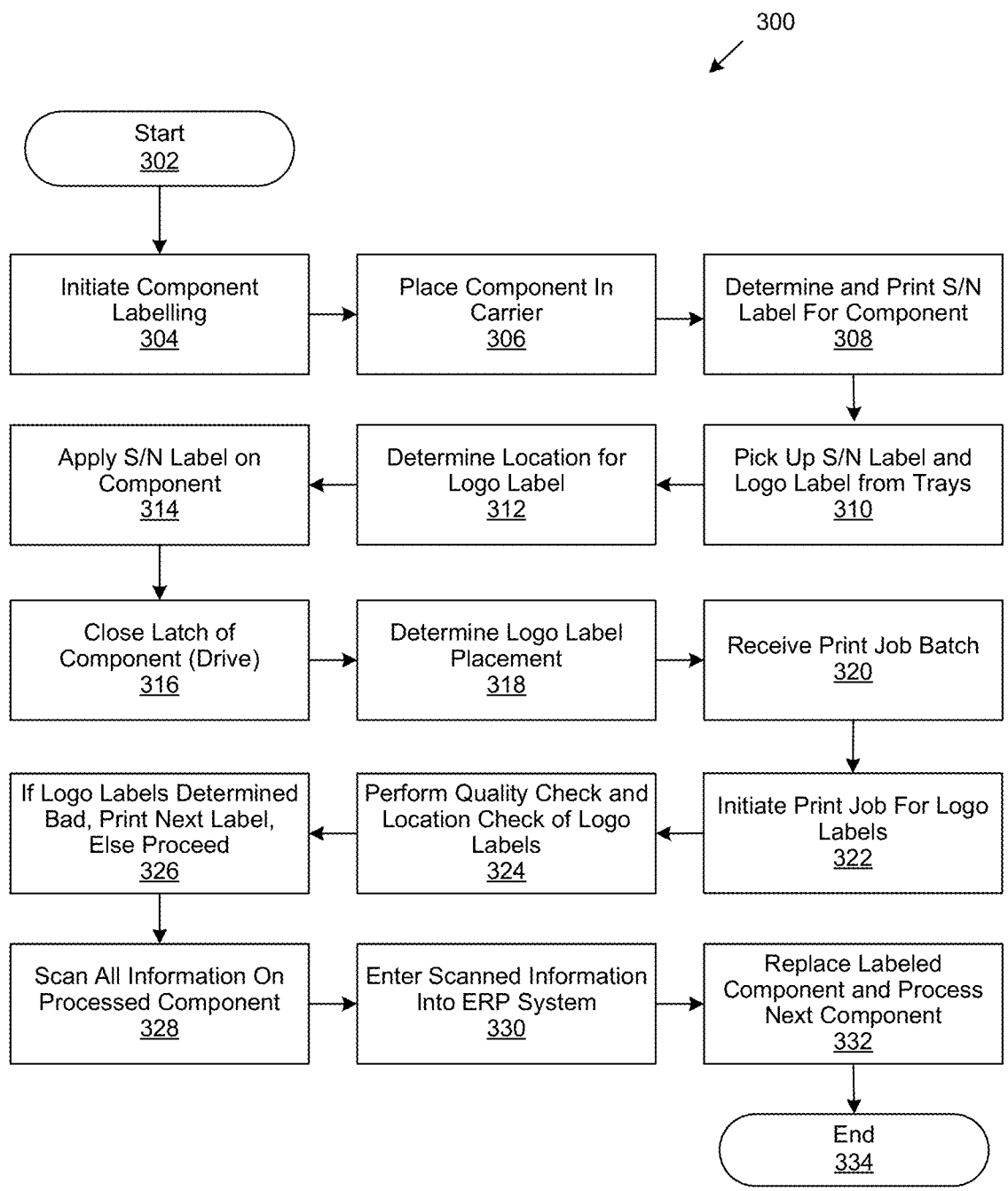
FIG. 3 shows a flow chart for automated labeling of components used in the manufacturing and integration of computer systems.

FIG. 3 is a generalized flowchart 300 for automated label processing. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 302, the process 300 starts. At step 304, component labeling 120 is initiated to begin the automated labeling process. At step 306, a component 208 such as a drive 210, is placed in a carrier 224. The carrier 224 is moved into position for label application on component 208. Carrier 224 can be specific to component 208 (e.g., drive 210). At step 308, a determination is made as to which a serial number (S/N) label 220 as to component 208. The S/N label 220 for component 208 is printed and placed in a tray 240. At step 310, an arm of cobot 226 picks up the S/N label 220 from the tray 240 and a logo label 222 from an array of logo labels 242 from tray or fixture 244. In certain implementations, a vacuum at the end of the arm of the cobot 226 picks up the S/N label 220 and logo label 222.

At step 312 a determination is made as to the location on component 208 to attach the label 222. As discussed, the determination can be based on perspective views from the arm of cobot 226 or camera A 230, and from a location proximate to the carrier 224 holding the component 208 or camera B 232. The determination can be a closed loop operation, where pictures (views) are taken by camera A 230 and camera B 232 at certain times while the arm of the cobot 226 moves in position to attach the logo label 222. For example, adjustments as to position of the arm of the cobot 226 can be made based as the arm of the cobot 226 converges on the exact location to attach the logo label 222. Precision is provided as to locating the location, since the logo label 222 is placed particularly in window 220 which has specific dimensions. Certain implementations can provide for a degree of tolerance in position. In other words, the "X, Y, Z" locations determined by the views of camera A 230 and camera B 232 will be the same or within an acceptable tolerance value.

At step 314, the S/N label 220 is attached to the component 208 as to a determined location for the S/N label 220. In certain implementations when the component 208 is a drive such as drives 210 and 212, the logo label 222 is attached on a window 220 of a door (e.g., door 214). In such implementations, at step 316, the latch of the drive is closed by cobot 236. At step 218, the location of the logo label 222 on the door 214 is determined.

At step 320, a determination is made if a print job batch of labels is needed. At 322, the printer 238 can be triggered by the component labeling 120 to perform the print job batch. In certain implementations, the printer 248 can be triggered to perform the printing when auto scan cameras are initiated. At step 324, a quality check is performed as to the print job includes barcode information and location of the logo labels 222 and array 242 of logo labels. At step 326, the quality check is determined to be "bad" then new labels are printed. Otherwise, process 300 proceeds.

At step 328, information from the attached labels on the processed component are scanned. The scanning can be performed by the camera C 234. At step 330, the scanned information is entered into the ERP system 122 for component serialization. At step 332, the processed component 208 with the attached labels is removed and a succeeding component 208 is processed. If no other components 208 are to be processed, then at step 334, the process 300 ends.

Figure 4:
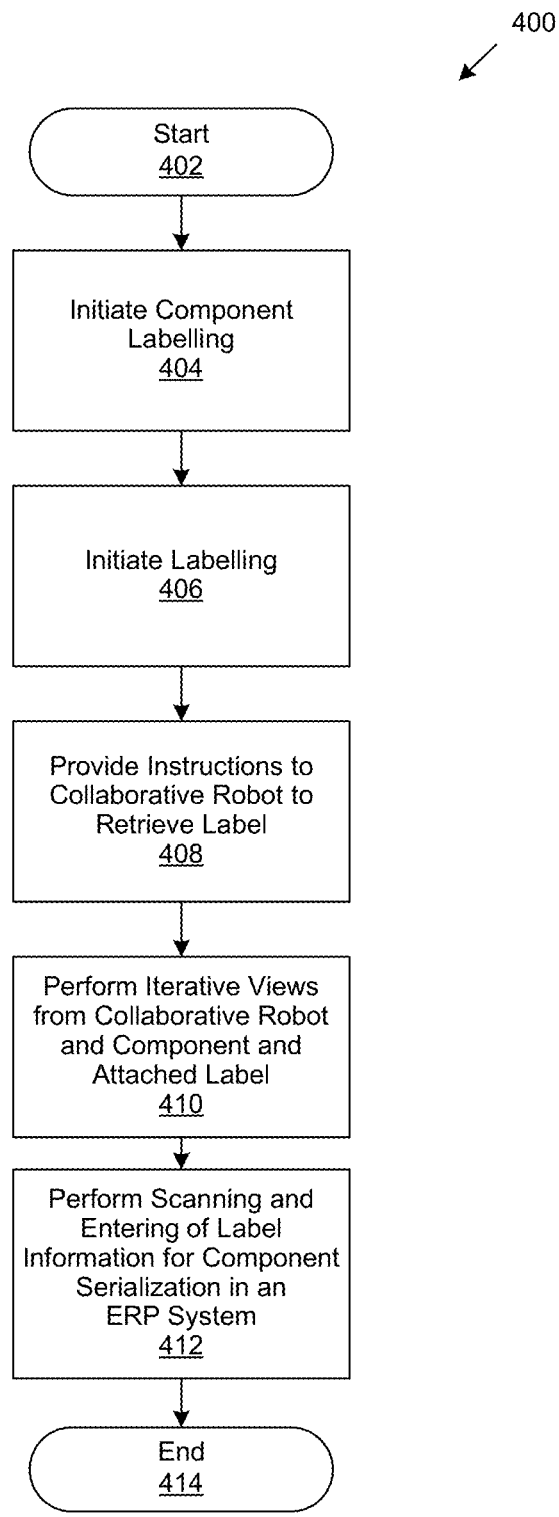
FIG. 4 shows a flow chart for labeling a component for component serialization.

FIG. 4 is a generalized flowchart 400 for labeling a component for component serialization. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 402, the process 400 starts. At step 404, the labeling of the component is initiated when a determination is made that a component (e.g., component 208) is in position for labeling.

At step 406, initiating the printing of a label for the component is performed. The label can be for a serial number (S/N) (e.g., label 220) that is specific to the component. The initiating provides for instructions to a printer (e.g., printer 238).

At step 408, instructions are provided to a collaborative robot or cobot (e.g., cobot 226) to pick up the label. The cobot moves the label to a determined location on the component.

At step 410, iterative views or a closed loop operation of views are performed from the perspective of the cobot and the component. A tolerance value between the views is determined, and when the tolerance value is reached, the able is attached to the component.

At 412, scanning of the attached label and any other attached labels on the component is performed. The information that is scanned is entered into an enterprise resource planning (ERP) system (e.g., ERP 122). At step 414, the process 400 ends.

As will be appreciated by one skilled in the art, the present invention can be embodied as a method, system, or computer program product. Accordingly, embodiments of the invention can be implemented entirely in hardware, entirely in software (including firmware, resident software, microcode, etc.) or in an embodiment combining software and hardware. These various embodiments can all generally be referred to herein as a "circuit," "module," or "system." Furthermore, the present invention can take the form of a computer program product on a computer-usable storage medium having computer-usable program code embodied in the medium.

Any suitable computer usable or computer readable medium can be utilized. The computer-usable or computer-readable medium can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium can be any medium that can contain, store, communicate, or transport the program for use by or in connection with the instruction execution system, apparatus, or device.

Computer program code for carrying out operations of the present invention can be written in an object oriented programming language such as Java, Smalltalk, C++ or the like. However, the computer program code for carrying out operations of the present invention can also be written in conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through a local area network (LAN) or a wide area network (WAN), or the connection can be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for labeling a component for component serialization and part identification comprising:
    initiate labeling of the component when a determination is made that the component is in position;
    initiate printing a label specific to the component;
    provide instructions to a single cobot to retrieve the label, wherein the single cobot moves the label into a determined location on the component for attaching;
    perform iterative closed loop relative views of the cobot and the component, using at least three cameras based on three dimensions, while the single cobot moves with the label, until a tolerance value is reached at which stage the label is attached, wherein a first camera is attached to an arm of the single cobot, a second camera is placed proximate to a carrier of the component, and a third camera is placed in a location to scan the label; and
    scan information from the label and any other attached labels for the component serialization in an enterprise resource planning (ERP) system.

2. The method of claim 1, wherein the cobot retrieves the label from underneath an elevated surface.

3. The method of claim 1, wherein the component is placed in the carrier which is specific to the component.

4. The method of claim 1 further comprising attaching one or more other labels.

5. The method of claim 4, wherein the one or more other labels are selected from printed label sheets.

6. The method of claim 1 further comprising closing a latch by the cobot, wherein a chamfered wheel forces the latch into a correct position.

7. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:
        initiate labeling of the component when a determination is made that the component is in position;
        initiate printing a label specific to the component;
        provide instructions to a single cobot to retrieve the label, wherein the single cobot moves the label into a determined location on the component for attaching;
        perform iterative closed loop relative views of the cobot and the component, using at least three cameras based on three dimensions, while the single cobot moves with the label, until a tolerance value is reached at which stage the label is attached, wherein a first camera is attached to an arm of the single cobot, a second camera is placed proximate to a carrier of the component, and a third camera is placed in a location to scan the label; and
        scan information from the label and any other attached labels for the component serialization in an enterprise resource planning (ERP) system.

8. The system of claim 7, wherein the component is drive unit for a computer system.

9. The system of claim 7, wherein the component is placed in the carrier which is specific to the component.

10. The system of claim 7, further comprising attaching one or more other labels.

11. The system of claim 10, wherein the one or more other labels are selected from printed label sheets.

12. The system of claim 1 further comprising initiating batch job printing of labels.

13. A non-transitory, computer-readable storage medium embodying computer program code, the computer program code comprising computer executable instructions configured to:
    initiate labeling of the component when a determination is made that the component is in position;
    initiate printing a label specific to the component;
    provide instructions to a single cobot to retrieve the label, wherein the single cobot moves the label into a determined location on the component for attaching;
    perform iterative closed loop relative views of the cobot and the component, using at least three cameras based on three dimensions, while the single cobot moves with the label, until a tolerance value is reached at which stage the label is attached, wherein a first camera is attached to an arm of the single cobot, a second camera is placed proximate to a carrier of the component, and a third camera is placed in a location to scan the label; and
    scan information from the label and any other attached labels for the component serialization in an enterprise resource planning (ERP) system.

14. The non-transitory, computer-readable storage medium of claim 13, wherein the component is drive unit for a computer system.

15. The non-transitory, computer-readable storage medium of claim 13, wherein the component is placed in the carrier which is specific to the component.

16. The non-transitory, computer-readable storage medium of claim 13 further comprising attaching one or more other labels.

17. The non-transitory, computer-readable storage medium of claim 16, wherein the one or more other labels are selected from printed label sheets.

* * * * *